United States Patent

Dempsey, Jr. et al.

[15] 3,639,680

[45] Feb. 1, 1972

[54] INSULATED BUS BAR ASSEMBLY

[72] Inventors: George A. Dempsey, Jr.; Martin F. Koenig; Clyde F. Robbins, all of Milwaukee, Wis.

[73] Assignee: Cutler-Hammer, Inc., Milwaukee, Wis.

[22] Filed: Dec. 7, 1970

[21] Appl. No.: 95,617

[52] U.S. Cl............................174/117 FF, 156/54, 156/55, 156/56, 174/68 B, 174/99 B, 174/120 R
[51] Int. Cl.....................H01b 7/02, H01b 7/08, H02g 5/06
[58] Field of Search....................174/16 B, 68 B, 70 B, 71 B, 174/72 B, 88 B, 99 B, 99 E, 117 R, 117 F, 120 R, 120 SR, 121 R, 121 SR, 122 R, 129 B, 133 B; 156/52–56

[56] References Cited

UNITED STATES PATENTS

| 753,461 | 3/1904 | Anderson | 174/117 FF UX |
|---|---|---|---|
| 3,098,113 | 7/1963 | Brierley | 174/26 R |
| 3,202,756 | 8/1965 | Stanback | 174/117 FF X |
| 3,346,687 | 10/1967 | Giger, Jr. et al. | 174/68 B |
| 3,461,222 | 8/1969 | Jorgensen | 174/117 FF |
| 3,584,137 | 6/1971 | Weimer | 174/117 FF X |

*Primary Examiner*—Laramie E. Askin
*Attorney*—Hugh R. Rather and William A. Autio

[57] ABSTRACT

Individual bus bars are insulated between their offset ends by two pairs of preformed U-shaped insulator strips having unequal length legs, the insulators of the respective pairs being slipped over the bar from opposite edges with the longer leg of each adjacent, and preferably tucked under, the shorter leg of the other and the second pair being disposed oppositely of the first pair. The offset ends are insulated either by a spiral wrap of insulating tape or a dip coating of insulation, each applied to overlap the ends of the preformed insulators. Three or four individually insulated bus bars are assembled with offset ends flared apart and have a preformed elongated rectangular insulator, slit along one side, disposed around the assembly between the innermost bends of the offset ends. The complete assembly between the offset portions is then tightly encased within a metallic housing.

6 Claims, 5 Drawing Figures

PATENTED FEB 1 1972　　3,639,680
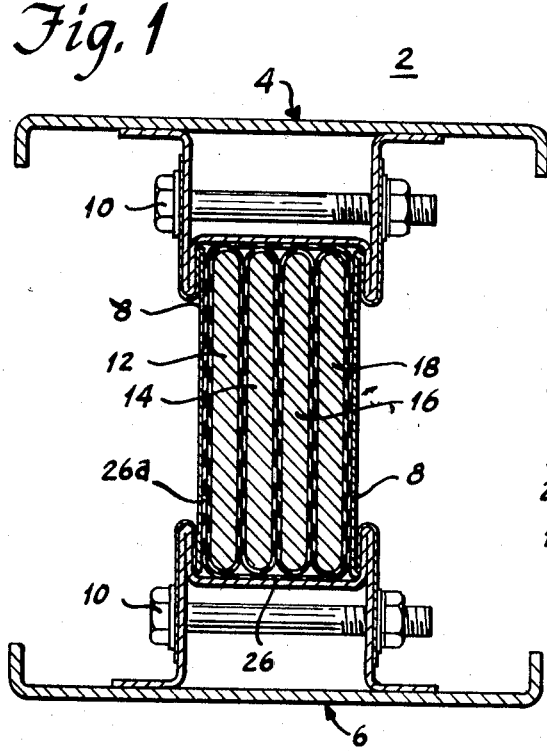
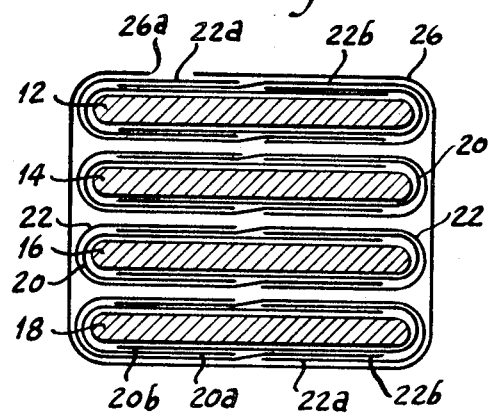
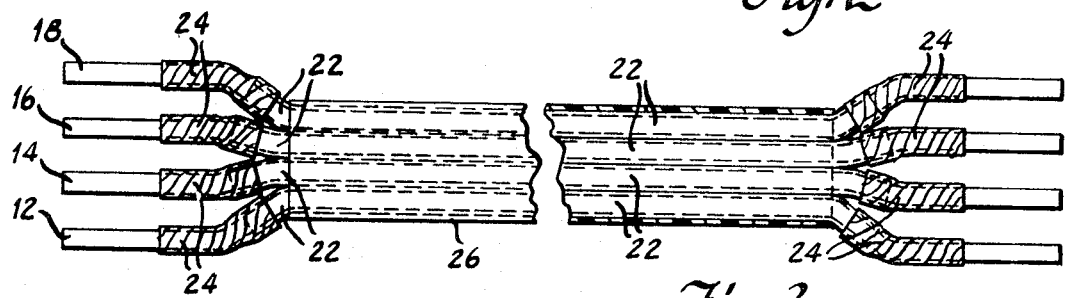
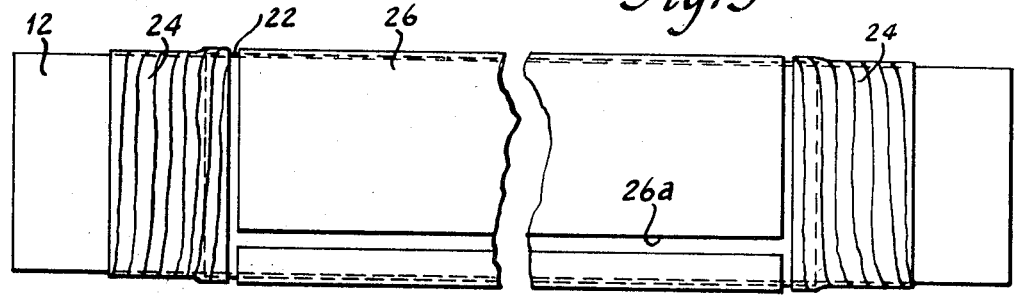
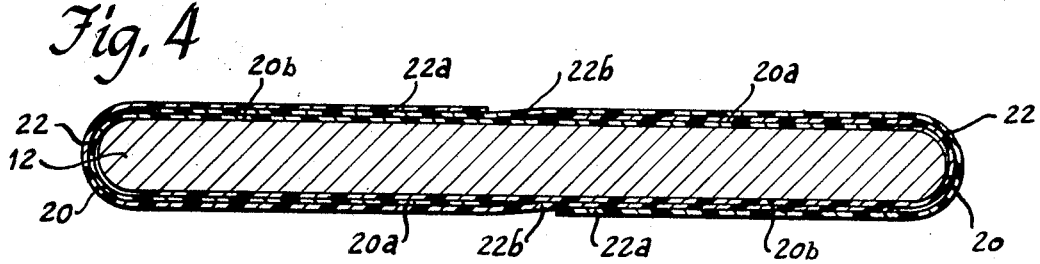

INSULATED BUS BAR ASSEMBLY

CROSS-REFERENCE TO RELATED APPLICATION

This application discloses individual and an assembled plurality of bus bars for use in an electrical feeder bus duct of the type particularly disclosed and claimed in a copending application of G. A. Dempsey, Jr., et al., Ser. No. 93,146, filed Nov. 27, 1970 and assigned to the assignee herein.

BACKGROUND OF THE INVENTION

This invention relates to bus bars for electric feeder busway and more particularly to improved insulating means therefor.

A preferred construction in feeder bus duct art presently has wide flat bus bars firmly compressed by the sides of the bus duct housing along the length thereof to provide an intimate thermally conductive contact between the bus bars and the housing. This construction provides a strong, compact structure having desirably low impedance and efficient heat dissipation but imposes more critical requirements on the electrical insulation for the bus bars. The insulation must be uniformly distributed over the flat surfaces of the bus bars to provide good thermal contact and must be free of thin spots, tears or other discontinuities which could readily lead to short circuit conditions in view of the close proximity of the bus bars. In manufacturing the bus bars, it is economically important that the insulation be capable of being readily applied over substantial lengths without employing costly subassembly process steps or tedious hand labor procedures.

SUMMARY OF THE INVENTION

The bus bar of this invention is insulated primarily with preformed insulating strips which are readily slipped onto the bus bar in a predetermined arrangement without the use of adhesive coatings or the need for shaping the insulation over the bus bar. The ends of each bus bar are angularly offset and therefore require a tape wrap, dip coating or the like to adequately insulate around the bends, such insulation being of a relatively short length and overlapping the ends of the preformed insulation to assist in maintaining the latter in position.

It is therefore a primary object of this invention to provide an insulated bus bar for a feeder bus duct which may be readily and inexpensively produced.

It is further an object of this invention to provide a bus bar for a feeder bus duct which is insulated primarily with a plurality of preformed strip insulation extending over the major length of the bus bar.

It is still a further object of this invention to provide a bus bar for a feeder bus duct which is insulated over the major portion of its length with preformed strip insulation uniquely shaped and arranged to provide a uniform thickness of insulation around the bus bar.

These and other objects and advantages of this invention will become more apparent in the following specification and claims when read in conjunction with the accompanying drawings.

BRIEF DESCRIPTION OF THE DRAWINGS

FIG. 1 is a cross-sectional view of a feeder bus duct structure containing the insulated bus bar assembly of this invention;

FIG. 2 is an edge elevational view of the insulated bus bar assembly of this invention with a portion of an outer insulating member shown in cross-section:

FIG. 3 is a side elevational view of the bus bar assembly of FIG. 2;

FIG. 4 is an enlarged cross-sectional view of a single bus bar and the preformed insulator strips therefor; and FIG. 5 is a cross-sectional view of the bus bar assembly of FIGS. 2 and 3 schematically showing the bus bars in a spaced apart relationship and the preformed insulator strips in a single line thickness.

DESCRIPTION OF THE PREFERRED EMBODIMENT

Referring to the drawings and particularly FIG. 1 thereof, a bus bar assembly is shown housed in a metallic feeder bus duct housing 2. The housing 2 comprises upper and lower channel assemblies 4 and 6, respectively, to which are secured a pair of sideplates 8 by bolt fastener means 10. The bus bar assembly is shown separately in edge and side elevational views in FIGS. 2 and 3, respectively, and includes four elongated wide flat bus bars 12, 14, 16 and 18 having offset opposite ends which flare outwardly to facilitate electrical and mechanical connection to the bus bars of adjoining busway apparatus.

The individual bus bars are insulated between the offset ends by first and second pairs of elongated preformed U-shaped insulators 20 and 22, respectively, although the latter have been shown in FIG. 1 as single thickness insulating means to simplify the drawing. As best seen in FIG. 4, insulators 20 and 22 are formed to have unequal length legs, the first pair having short legs 20a and long legs 20b and the second pair having short legs 22a and long legs 22b.

The first pair of insulators 20 are slipped over the opposite longitudinal edges of the bus bar to have the legs thereof extend toward the legs of the opposite insulator of the pair and cooperatively totally encase the bus bar over its major length between the offset end portions. Insulators 20 are so arranged on the bus bar as to have the short leg 20a of each be positioned adjacent the long leg 20b of the other insulator, and preferably the short legs 20a and positioned to overlie the respective adjacent long legs 20b of the other insulator. It is to be noted in FIG. 4 that the long legs 20b are formed to extend over substantially the entire flat side of the bus bar while the shorter legs 20a extend over substantially one-half or less of the flat side.

The second pair of insulators 22 are also slipped over the opposite longitudinal edges of the bus bar, but are placed over the insulators 20 and oppositely disposed with respect thereto to have the short legs 22a extend toward the short legs 20a of the first pair of insulators. The second pair of insulators 22 cooperatively totally encase the bus bar and first pair of insulators and are also arranged to have the short legs 22a thereof adjacent, and preferably overlying, the long legs 22b of the respective other insulator of the second pair. Similarly to insulators 20, the long legs 22b of insulators 22 are formed to extend over substantially the entire flat side of the bus bar while the short legs 22a thereof are formed to extend over substantially one-half or less of the flat side. Thus it may be seen in FIG. 4 that the foregoing arrangement of insulators 20 and 22 provide a substantially uniform thickness of insulation on each of the flat sides of the bus bar and that a coextensive line is maintained along the flat sides between the opposite insulators of the second pair to provide good thermal contact between adjacent bus bars in assembly as will be described later. Also the foregoing arrangement of insulators 20 and 22 has the additional advantage of not having any free ends of the insulators adjacent the longitudinal edges of the bus bar where the same may be stubbed or otherwise damaged in subsequent handling of the bar prior to final assembly.

With reference to FIG. 2, it can be seen that the bus bar insulation comprising preformed insulator strips 20 and 22 extends a short distance beyond the innermost bends of the offset end portions of the bus bars. The rigidity of the preformed strips precludes their being used to insulate around both ends of the angular offset end portions, however, and a secondary means of insulating these relatively short lengths must be provided.

A preferred means of insulating the latter portions is to apply a spiral wrap of insulating tape 24 as shown in FIGS. 2 and 3. The tape originates near the innermost bends to overlap the preformed strips 20 and 22, thereby also serving to maintain the strips in position on the bus bar. A dip coating of insulation may be applied as a substitute for the tape 24, the coating being applied in successive dips to achieve the necessary thickness and to a depth wherein it too would overlap the ends of strips 20 and 22.

The individually insulated bus bars 12, 14, 16 and 18 are grouped together as seen in FIGS. 2 and 3 to have the major length flat surfaces adjacent. An elongated preformed insulator 26 of rectangular cross section and having a slit 26a (FIG. 3) along one side is placed around the adjacent flat portions of the assembly of bus bars to extend between the innermost bends thereof. The assembly is tightly compressed by the opposite sides 8 of the metallic bus duct housing 2 as seen in FIG. 1 to finally maintain the bus bars assembled.

Although this invention is primarily concerned with the arrangement and shape of the insulators on the individual and assembled bus bars, the choice of insulating materials therefor forms a large factor in the total success of the foregoing arrangement. While the insulators are not limited to the following materials, it is preferred to construct the first pair of insulator strips 20 and the external rectangular insulator 26 from a totally saturated polyester fiber and film laminate material such as that commercially available under the designation ESTERMAT DM100. The second pair of insulators 22 are preferably formed by a polyester film such as that available under the designation MYLAR. The tape is preferably a Class B tape while the dip insulation is a silicone rubber commercially available under the designation SILASTIC S-2288.

Thus there is disclosed in the foregoing a bus bar insulated by a plurality of open-edge preformed insulator strips slipped over the opposite longitudinal edges of the bus bar to form a totally enclosing uniform insulation covering thereon. The novel designs and arrangement of preformed insulators reduces the use of adhesives and time consuming wrapping procedures to only minimal areas at the ends of each bus bar. A preformed insulator is also employed as the final insulator around an assembly of bus bars to further reduce the need for adhesives or wrapping procedures.

We claim:

1. An elongated wide flat electrical bus bar including electrical insulation means comprising:
   a first pair of elongated insulator strips preformed to have U-shaped cross-sectional configurations with unequal length legs, said first pair of insulators being disposed over said bus bar from opposite longitudinal edges to have the legs of the opposite insulators extend toward each other with the short leg of each insulator adjacent the long leg of the other insulator of said first pair; and
   a second pair of elongated insulator strips preformed to have U-shaped cross-sectional configurations with unequal length legs, said second pair of insulators being disposed over said bus bar and said first pair of insulators from opposite longitudinal edges thereof to have the legs of the opposite insulators of the second pair extend toward each other and have the short legs thereof extend toward the short legs of said first pair of insulators.

2. The combination according to claim 1 wherein the short leg of each insulator of said first pair of insulators overlies the long leg of the other insulator of said first pair, and the short leg of each insulator of said second pair of insulators overlies the long leg of the other insulator of said second pair.

3. The combination according to claim 2 wherein said long legs of each of said first and second pairs of insulators extend over substantially the entire width of the flat surface of said bus bar and wherein said short legs of said first and second pairs of insulators extend over less than one-half of the width of said flat surface.

4. The combination according to claim 3 wherein a plurality of said bus bars, individually electrically insulated with said first and second pairs of insulators, are assembled in flatwise adjacent relationship to have the second pair of insulators of each bus bar in direct flatside contact with the second pair of insulators of adjacent bus bars on either side, together with an elongated insulator preformed to have a rectangular cross-sectional configuration generally conforming to the cross-sectional outline of said assembly of insulated bus bars and being longitudinally slit along one side, said last-mentioned insulator being disposed around said assembly of insulated bus bars.

5. The combination according to claim 4 wherein said first pair and last-mentioned insulators are formed of a polyester fiber and film laminate material and said second pair of insulators is formed of a polyester film.

6. The combination according to claim 3 wherein the opposite ends of said bus bar are offset and said first and second pairs of insulators extend beyond the innermost bends of said opposite offset ends, together with flexible electrical insulation means disposed around said offset portions and overlapping the respective ends of said first and second pairs of insulators.

* * * * *